Nov. 27, 1923
J. D. CUMMINGS
SOUND BOX
Filed May 10, 1920
1,475,754
2 Sheets-Sheet 1
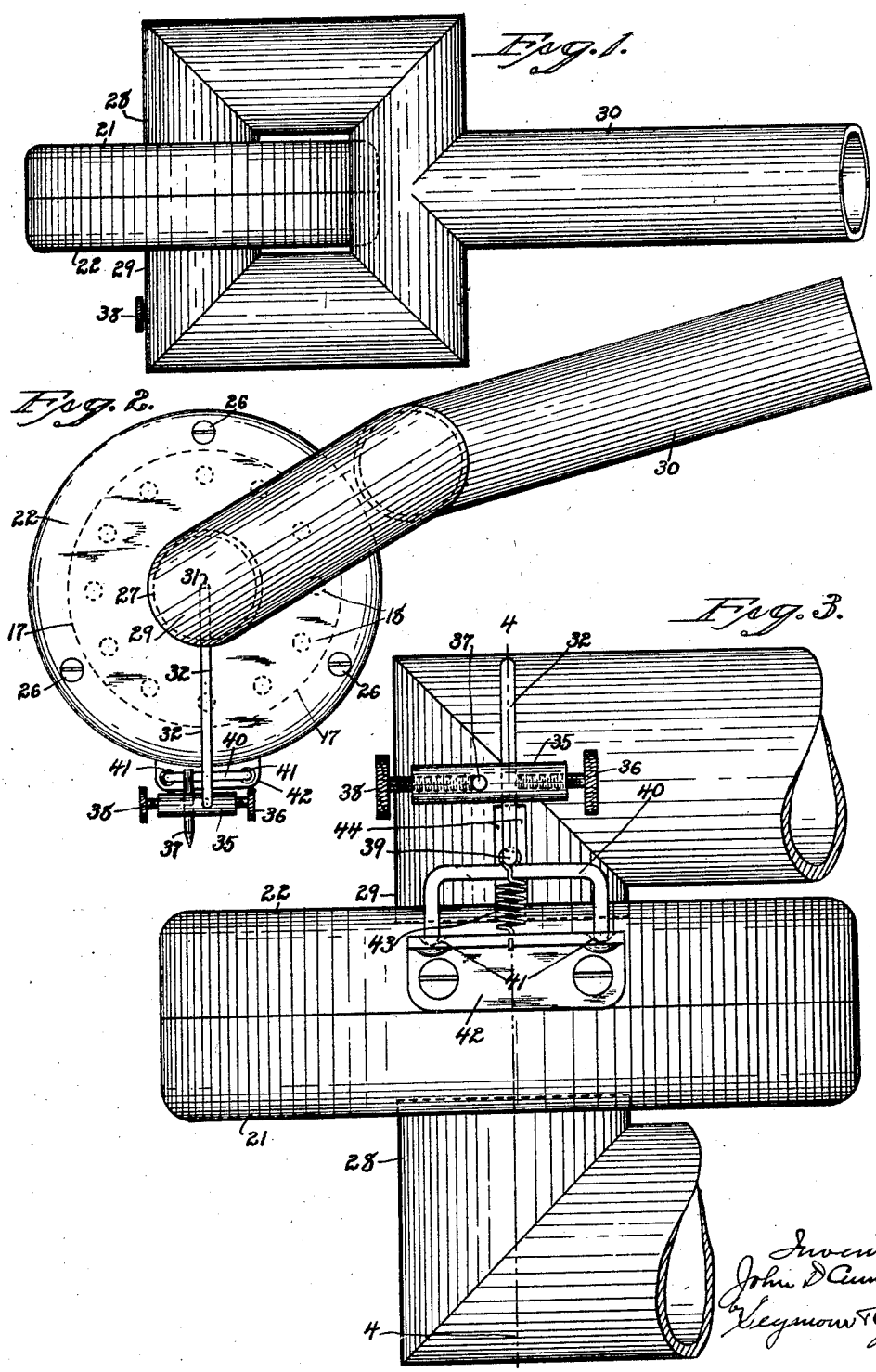

Nov. 27, 1923.  J. D. CUMMINGS  1,475,754
SOUND BOX
Filed May 10, 1920   2 Sheets-Sheet 2
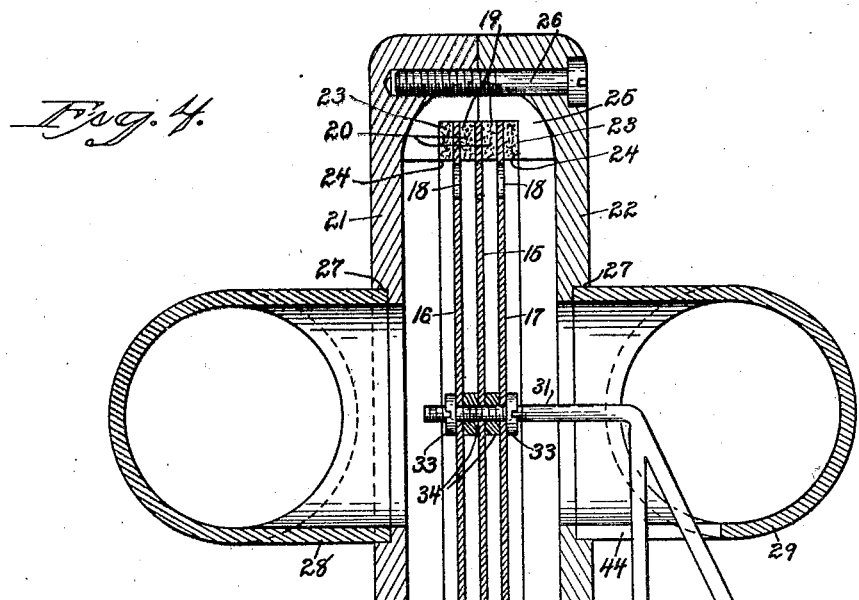
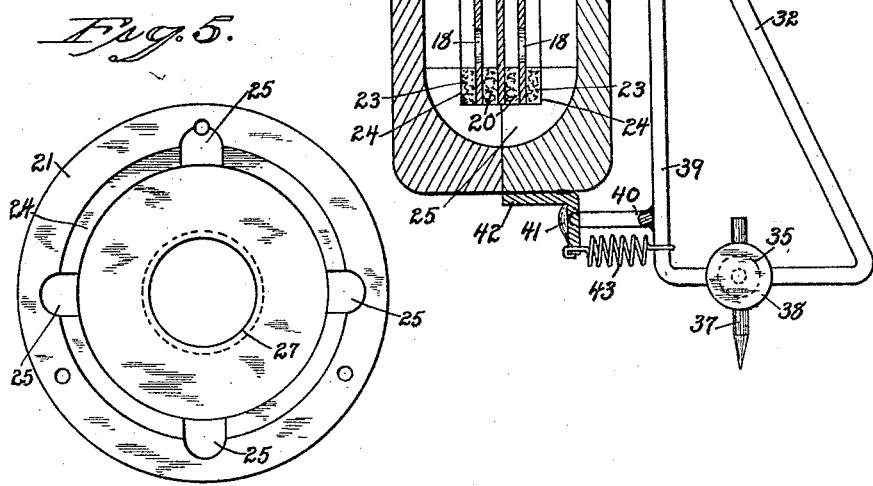
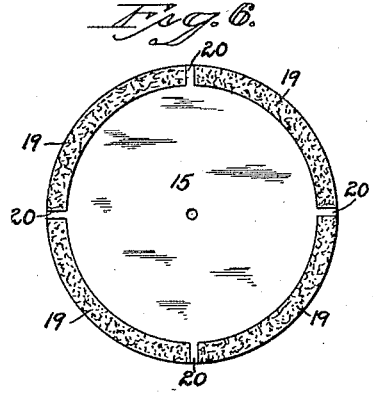
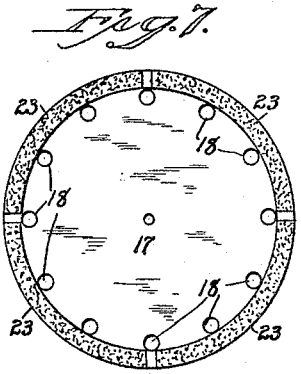
Inventor
John D. Cummings
Seymour Earle
Attys Patented Nov. 27, 1923.

1,475,754

UNITED STATES PATENT OFFICE.

JOHN D. CUMMINGS, OF SOUTHINGTON, CONNECTICUT.

SOUND BOX.

Application filed May 10, 1920. Serial No. 380,229.

*To all whom it may concern:*

Be it known that I, JOHN D. CUMMINGS, a citizen of the United States, residing at Southington, in the county of Hartford and State of Connecticut, have invented a new and useful Improvement in Sound Boxes; and I do hereby declare the following, when taken in connection with the accompanying drawings and the characters of reference marked thereon, to be a full, clear, and exact description of the same, and which said drawings constitute part of this application, and represent, in—

Fig. 1, a top or plan view of a sound box constructed in accordance with my invention.

Fig. 2, a side view of the same.

Fig. 3, an under side view of the same.

Fig. 4, a sectional view on the line 4—4 of Fig. 3.

Fig. 5, an inside view of one member of the sound box on a reduced scale.

Fig. 6, a plan view of the central diaphragm.

Fig. 7, a plan view of one of the outside diaphragms.

This invention relates to an improvement in sound boxes for sound-reproducing instruments and particularly to that class of sound boxes which are used to modify the tone, the object being to provide a sound box with a plurality of diaphragms and provide one or more of the diaphragms with a series of openings through which the sound-waves may escape. A further object of the invention is to so mount the sound box that the sound-waves escaping therefrom will uniformly pass to the horn. A further object of the invention is to provide an adjustable needle-holder; and the invention consists in the construction and arrangement of parts as hereinafter described and particularly recited in the claims.

In carrying out my invention, as herein shown, I employ a central diaphragm 15, preferably formed from a thin disk of wood, and outer diaphragms 16 and 17 formed from cardboard, thin wood, metal, or other suitable material, and each of these outside diaphragms is formed with an annular series of holes 18 near its outer edge. The outer diaphragms are separated from the central diaphragm by segments 19 of felt or other suitable material, each segment being less than a quarter circle so as to leave passages 20 between their ends; it is to be understood, however, that the segments do not necessarily have to be less than a quarter of a circle as there may be as many segments as desired in order to provide spaces or passages between the adjacent ends thereof for permitting the free passage of the sound waves; and between the outer faces of the outer disks and the members 21 and 22 of the sound box are similar strips 23 which rest upon shoulders 24 formed for them in the inner walls of the sound box, which is provided with notches 25 in line with the openings between the ends of the segments of felt. The parts of the diaphragm are assembled as a unit forming a hollow diaphragm. The purpose of the notches 25 is to provide a means which will register with the passages formed between the adjacent ends of the segments whereby the sound waves will be permitted to pass therethrough. As herein shown, the two members 21 and 22 of the sound box are connected together by screws 26 and in the center of each member is an opening 27 to receive the ends 28 and 29 of a sound tube 30.

The diaphragms are mounted upon the inner end 31 of a needle-holder 32, the inner end being threaded to receive lock nuts 33 by which the disks are held in position, the disks being separated by spacing washers 34. The needle-holder is made from wire in the form of a triangle, upon the base of which slides a needle-holder 35 which is adjustable longitudinally, being clamped in place by a set screw 36 and adapted to carry a needle 37 which is held in place by a set screw 38. Attached to the arm 39 of the needle-holder is a yoke 40 the ends of which rest in notches 41 in a plate 42 secured to the member 22 of the sound box, the yoke being held in engagement with the plate by a spring 43 which permits the needle-carrier to rock as required. It may here be stated that the end 29 of the sound tube is formed with a slot 44 for the clearance of the needle-holder.

In this construction, I derive all the advantages of a plurality of diaphragms, in the way of moderating the tones; and by providing the outer diaphragms with openings through which sound-waves may pass, these sound-waves escape into the sound box without interruption. By forming openings on opposite sides of the sound box, the movement of the sound-waves is equalized so that much better effects are produced than with an opening on one side only. By arranging for the adjustment of the needle, the same device may be used with a variety of instruments. It is obvious that one of the outside diaphragms might be omitted, if desired, and particularly with sound boxes having an opening on one side only.

I claim:

1. In a sound reproducing mechanism, a sound box provided with annular shoulders, the said annular shoulders having spaced notches therein, a plurality of parallel spaced discs therein, spacing members interposed between the said discs and the annular shoulders, said spacing members provided with recesses for communication with said notches in the annular shoulders, and a needle arm centrally associated with said discs in the sound box for supporting the same.

2. In a sound reproducing mechanism, a sound box comprising two like parts secured together, annular shoulders formed on the inner walls of the said sound box, and adjacent the outer edge thereof, the said annular shoulders provided with spaced notches therein, a plurality of parallel spaced discs centrally supported in said sound box, spacing members adjacent the periphery of the said parallel spaced discs, spacing members on said annular shoulders for holding said discs in parallel spaced relation with each other and with the walls of said sound box, said first mentioned spacing members provided with recesses for communication with the spaced notches in the shoulders.

In testimony whereof, I have signed this specification in the presence of two subscribing witnesses.

JOHN D. CUMMINGS.

Witnesses:
KATHERINE R. DONLAN,
H. H. MERRELL.